(12) United States Patent
Schierman

(10) Patent No.: US 7,377,457 B2
(45) Date of Patent: May 27, 2008

(54) AGRICULTURAL BALE CUTTER

(76) Inventor: Allan Wesley Schierman, PO Box 149, Vulcan, Alberta (CA) T0L 2B0

( * ) Notice: Subject to any disclaimer, the term of this patent is extended or adjusted under 35 U.S.C. 154(b) by 198 days.

(21) Appl. No.: 11/477,708

(22) Filed: Jun. 29, 2006

(65) Prior Publication Data

US 2008/0041989 A1    Feb. 21, 2008

(51) Int. Cl.
   *A01D 34/00*    (2006.01)
   *B02B 5/02*    (2006.01)
   *B02C 9/04*    (2006.01)
   *B02C 19/00*    (2006.01)
   *B03B 7/00*    (2006.01)

(52) U.S. Cl. .................... 241/101.76; 241/605; 241/30

(58) Field of Classification Search ................ 241/605, 241/101.76, 30, 283; 83/928, 694, 932
   See application file for complete search history.

(56) References Cited

U.S. PATENT DOCUMENTS

| | | |
|---|---|---|
| 3,490,214 A | 1/1970 | Cullimore |
| 4,411,573 A | 10/1983 | Townsend |
| 4,449,672 A | 5/1984 | Morlock et al. |
| 4,497,163 A | 2/1985 | Ogman |
| 4,549,481 A * | 10/1985 | Groeneveld et al. ...... 100/98 R |
| 4,597,703 A | 7/1986 | Bartolini |
| 4,771,670 A * | 9/1988 | Woerman ..................... 83/861 |
| 4,923,128 A | 5/1990 | Ostrowski |
| 4,996,899 A | 3/1991 | Henderson |
| 5,161,448 A | 11/1992 | Wangsness |
| 5,242,121 A * | 9/1993 | Neier ........................... 241/28 |
| 5,340,042 A | 8/1994 | Bergkamp et al. |
| 5,542,326 A * | 8/1996 | Borgford ..................... 83/795 |
| 5,544,822 A * | 8/1996 | Neier .................... 241/101.73 |
| 5,934,578 A | 8/1999 | Ramer |

\* cited by examiner

*Primary Examiner*—Bena Miller
(74) *Attorney, Agent, or Firm*—Gene Scott; Patent Law & Venture Group

(57) ABSTRACT

An agricultural bale cutter has a scoop shaped lower jaw frame supporting a first set of teeth at a lower end and is pivotally mounted to an upper jaw frame. A second set of teeth mounted on the upper jaw frame may therefore be moved between distal and proximal positions relative to the first set of horizontal teeth for cutting a bale that is held between the upper and lower jaw frames. The frames are manipulated by hydraulic linear actuators so that both the lower and upper frames may be lifted by a front end loader mounted on a tractor and the upper jaw may be moved relative to the lower jaw for picking up a bale, cutting the bale and dropping a first cut portion of the bale at a first location and a second portion at a different location.

16 Claims, 4 Drawing Sheets

AGRICULTURAL BALE CUTTER

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to mechanized farm equipment and more particularly to such equipment relating to hay bales or other crop bales, and specifically to the transport, cutting or splitting of such bales.

2. Description of Related Art including information disclosed under 37 CFR 1.97 and 1.98

Ramer, U.S. Pat. No. 5,934,578, discloses a round bale cutter having an open bale loading side and a cut hay exhaust side with a bale receiving area on a floor in between. The cutter includes a housing with a gap on the hay exhaust side extending the length of the machine just above the floor and a hay reprocessing chamber attached to housing and extending outward and downward from the gap. A rotary cutter drum equipped with knives about its periphery is supported on a drive shaft which extends from end to end of the housing, with the cutter drum being positioned in the gap in contact with a hay bale in the bale receiving area. The hay bale is initially cut by the drum, propelling cut hay strands into the hay reprocessing chamber where they circulate long enough to hit the rotary drum knives again. The twice cut strands, which are small enough to be used in feed mixing operations, are then expelled through an exhaust side opening in the hay reprocessing chamber. Borgford, U.S. Pat. No. 5,542,326, discloses an apparatus for cutting baled crop materials particularly of the cylindrical bale type comprised of an apparatus in the form of a conventional chain saw in which the chain is modified so that either the slide links or the guide links include an outwardly projecting cutting plate. The cutting plate is shaped to form a cutting edge having a ramp shape commencing at a position intersecting the previous link and extending outwardly at a gradual inclination of the order of 20.degree. to an outermost point and then a trailing edge which extends backwardly toward the main body of the chain. The width of the cutting plate is less than the width of the chain itself in view of the tension in the bale which pulls the bale apart as it is cut. Bergkamp et al., U.S. Pat. No. 5,340,042, discloses a horizontally oriented three sided frame that is adapted to hold a round hay bale. An endless chain driven conveyor in the floor of the frame causes the round bale to rotate about a longitudinal axis while simultaneously urging a portion of the perimeter of the bale against a sickle bar cutter arrayed just above the floor on one side of the frame. The cutter chops the hay bale into manageable portions for feeding to livestock. The sickle bar cutter includes a conventional reciprocating cutter bar with triangularly shaped cutting teeth arranged continuously along the bar. A specially designed blade guide allows the entire cutting surfaces of the teeth to extend past the blade guide as they reciprocate. This insures that the hay bale is fed rapidly into the reciprocating teeth since no blade guide teeth enter the cutting gaps between the cutting teeth as they reciprocate and thus do not interfere with the advancement of the hay bale into cutter. Neier, U.S. Pat. No. 5,242,121, discloses a frame work mounted on a 3 point hitch of a tractor and including on its lower end a pair of bale support forks extending rearwardly. A pair of vertically disposed rails carry a vertically movable sickle cutter which extends parallel to the support forks and is centered to move therebetween when cutting through a bale positioned on the forks with its longitudinal axis parallel to the forks and the sickle cutter. The round bale of hay can be cut into half sections and then again into quarter sections. The bale support and cutter may be used for transporting bales with the sickle cutter pressing down against the top of the bale. Wangsness, U.S. Pat. No. 5,161,448, discloses a bale saw for cutting up large, cylindrical hay bales including a frame for quick mounting on a tractor load bucket. The frame includes a cross member and rearwardly projecting upper and lower structures which slidably mount over the bottom of the load bucket. A top member on the frame bolts to the top of the load bucket. Cable winches further strap the frame to the load bucket. A hydraulic motor, powered by the tractor hydraulic system, rotates a chain saw mounted on the frame. The tractor is driven up to a large hay bale, and the bucket may be adjusted to any height to cut the bale into pieces small enough for easy handling. Henderson, U.S. Pat. No. 4,996,899, discloses a hay bale cutter and a method of cutting a hay bale open, particularly suited for large round bales. The cutter has an elongate generally horizontal blade with a sharpened cutting leading edge, a skid on a lower edge for keeping the blade above ground, an upward facing support surface for support of a cut bale on the blade, and structure for securing the trailing end of the blade to a motor vehicle. The method has the steps of mounting the blade on a vehicle, taking the vehicle and mounted blade to a hay bale, spearing the sharpened end of the blade into one end of the bale, and plunging the blade through the length of the bale to cut the bale open along a radius of the bale. Ostrowski, U.S. Pat. No. 4,923,128, discloses a shredder and dispensing device for baled crop materials comprises a frame having coupling arrangements for mounting upon the front end loader linkage of a tractor. The frame carries a horizontal conveyor construction which has an inclined ramp at a forward end so that the ramp can be inserted underneath a bale to slide the ramp and conveyor under the bale to lift the bale onto the conveyor. The conveyor moves the bale toward one side of the device at which a shredder roller is provided with a suitable duct housing to direct the material out to one side of the implement. A deflector can be used to direct the material into feed bunks. The conveyor is mounted on a conveyor frame which can be raised to an inclined angle toward the shredder. The implement enables the handling and shredding of the bale in a simplified manner using a single machine. Woerman, U.S. Pat. No.

4,771,670, discloses a method and apparatus for slicing, lifting and carrying round bales or the like. The method for slicing the bale consists of making a radial cut through the length of the bale. The radial cut causes the circumferentially wrapped bale fibers to be cut which causes bale to open up. A partial radial cut, leaving the outer bale fibers uncut, can be made leaving bale substantially in a cylindrical shape to facilitate easy transport with a forklift like carrier. The apparatus consists of a mast assembly mounted to raiseable three point hitch of an agricultural tractor or the like. A pair of parallel forks are directly attached to mast and engage the curved sides of bale so as to lift and support bale for easy transport. A hydraulically activated knife assembly is attached to mast and forks. The knife has serrated teeth which cut through bale when knife reciprocates. A bumper or work guide when attached to the end of forks holds bale during cutting process. Bartolini, U.S. Pat. No. 4,597,703, discloses a bale handling and hay distributing apparatus comprised of a round-bale holder equipped with a device for rotating the bale around its central axis and a hay shredding unit. The bale holder is supported by a lift mechanism having a pair of vertically movable, projecting arms at the end of which the holder is pivotally connected. A device for rotating the bale holder with respect to the supporting lift mechanism is provided, so that the holder can be positioned in a hay dispensing position and in two different bale loading positions respectively rotated of an angle of 90.degree. and 180.degree with respect to the hay dispensing position. Hooks projecting from the longitudinal sides of the holder are provided having a cooperating jaw-movement for grasping the bale during loading operation. Ogman, U.S. Pat. No. 4,497,163, discloses an apparatus for slicing a large round bale into two or more parts prior to discharge from the baler. Slicing is accomplished by inserting a knife blade into the bale-forming chamber during or subsequent to the tying-off event while the bale rotates. The cutting means is inserted into the sidewalls of the baler and into the baling chamber. As the bale is rotated, the cutting means cuts the bale. Typically, a ring and core are formed. The preferred configurations of the core are cylinders or conical structures. Morlock et al., U.S. Pat. No. 4,449,672, discloses a machine for grinding large bales of forage material is provided with a cradle pivotably mounted on a frame. The cradle is movable to a lowered position in which lifting members can engage a bale of crop material lying on the ground. The cradle can be pivoted to a working position in which gravity directs the bale against a grinder. The discharge of the comminuted forage material from the grinder is controlled by an adjustable deflector. A conveyor urges the bale toward the grinder, and tends to rotate the bale to evenly grind or chop away the outer periphery of the bale. Townsend, U.S. Pat. No. 4,411,573, discloses a bale handling apparatus including a frame portion, a bale moving portion, a bale engaging portion and a control portion; the frame portion including a base section, the base section including a pair of substantially parallel spaced side members; the bale moving portion including rotatable mechanism extending between the side members of the base section, the rotatable mechanism being disposed along the side members of the base section; the bale engaging portion including hook mechanism pivotally connected to the frame portion adjacent one edge thereof, the hook mechanism being oriented substantially parallel to the side members of the base section, the hook mechanism being of a length substantially the same as the side members; the control portion including mechanism for driving the rotatable mechanism, mechanism for pivoting the hook mechanism with respect to the base section and mechanism for changing the position of the base section; whereby when the apparatus is attached to a vehicle, a round bale may be positioned on the apparatus by tilting the base section and grasping the bale between the hook mechanism and the base section, and the bale may be opened and distributed by raising the base section and driving the rotatable mechanism to unroll the bale. Cullimore, U.S. Pat. No. 3,490,214, discloses an agricultural cutting mechanism comprising a cutter support bar with guide means, a set of reciprocal knife blade elements, and a set of resilient static fingers mounted on the cutter support bar to exert a pressure on the abutting slidable surfaces of the knife blade elements. Cutting is performed between the edges of the knife blades and the resilient fingers on reciprocation of the knife blades.

The related art described above discloses a variety of machines for cutting crops, bale handling, loading and shredding bales, slicing bales, and opening bales. However, the prior art fails to disclose a machine that is able to lift and cut bales in the effective manner of the present apparatus. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

As described above, there are many machines designed for utilizing feed bales of various kinds. The agricultural bale cutter described and claimed herein has a scoop shaped lower jaw frame supporting a first set of horizontal teeth at a lower end and is pivotally mounted to an upper jaw frame. A second set of horizontal teeth are mounted on the upper jaw frame and may therefore be moved between distal and proximal positions relative to the first set of horizontal teeth for cutting a hay bale that is held between the upper and lower jaw frames. The frames are manipulated by hydraulic linear actuators so that both the lower and upper frames may be lifted by a front end loader mounted on a tractor and the upper jaw may be moved relative to the lower jaw for picking up a bale, cutting the bale and dropping a first cut portion of the bale at a first location and a second portion at a different location. This simple and useful machine is used to effectively pickup and carry bales, and to cut bales into two or more parts.

A primary objective inherent in the above described apparatus and method of use is to provide advantages not taught by the prior art.

Another objective is to provide a bale handler capable of picking up a bale and carrying it to a desired location where it may be placed without damage to the bale.

A further objective is to provide such a machine capable of cutting a bale into two or more parts for placement at one or more locations.

A further objective is to provide such a machine with a bucket shaped frame that may be attached to a front end loader in place of its bucket.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention. In such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 3:
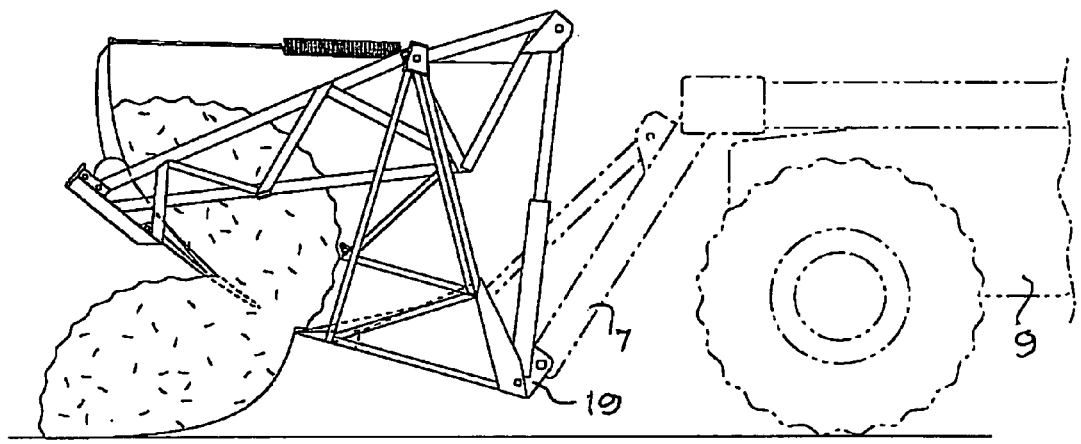
FIG. 3 is a side elevational view thereof showing more fully closed jaws severing the bale with a severed lower portion of the bale dropping to a ground surface.

Described now in detail is an agricultural bale cutter apparatus for lifting, carrying and cutting bales 5 of hay and other crops of which such bales are formed as is well known. As shown in the figures, the apparatus has a scoop shaped lower jaw frame 10 supporting a first set of preferably horizontal teeth 12 (FIG. 6) at a lower end 14 of this frame 10, and two pivot pins 16 at an upper end 18 of the frame 10 (FIG. 5). The lower jaw frame 10 engages an upper jaw frame 20 in pivotal rotation about the pivot pins 16 at journals 24 mounted in the upper jaw frame 20, thereby moving a second set of preferably horizontal teeth 22 which are mounted on a lower end 28 of the upper jaw frame 20 between a distal position "A" shown in FIG. 1, and a proximal position "B" shown in FIGS. 4 and 5, whereby movement of the teeth 22 are referred to relative to the first set of horizontal teeth 12 and this movement enables the apparatus to cut bale 5 as shown in FIG. 3. At least one, and preferably two, linear extensors 30 such as pneumatic or hydraulic actuation cylinders are engaged between the lower 10 and upper 20 jaw frames to provide the pivotal rotation of the upper jaw frame 20 via linear actuation along the path shown by arrow "C" in FIG. 5.

Preferably, the first set of horizontal teeth 12 are formed without a cutting edge and are therefore blunt, primarily providing a support surface for the bales 5, and the second set of horizontal teeth 22 are formed with cutting edges 22' directed toward the first set of teeth 12 and are used for severing the bales 5 as shown in FIG. 3.

Figure 6:
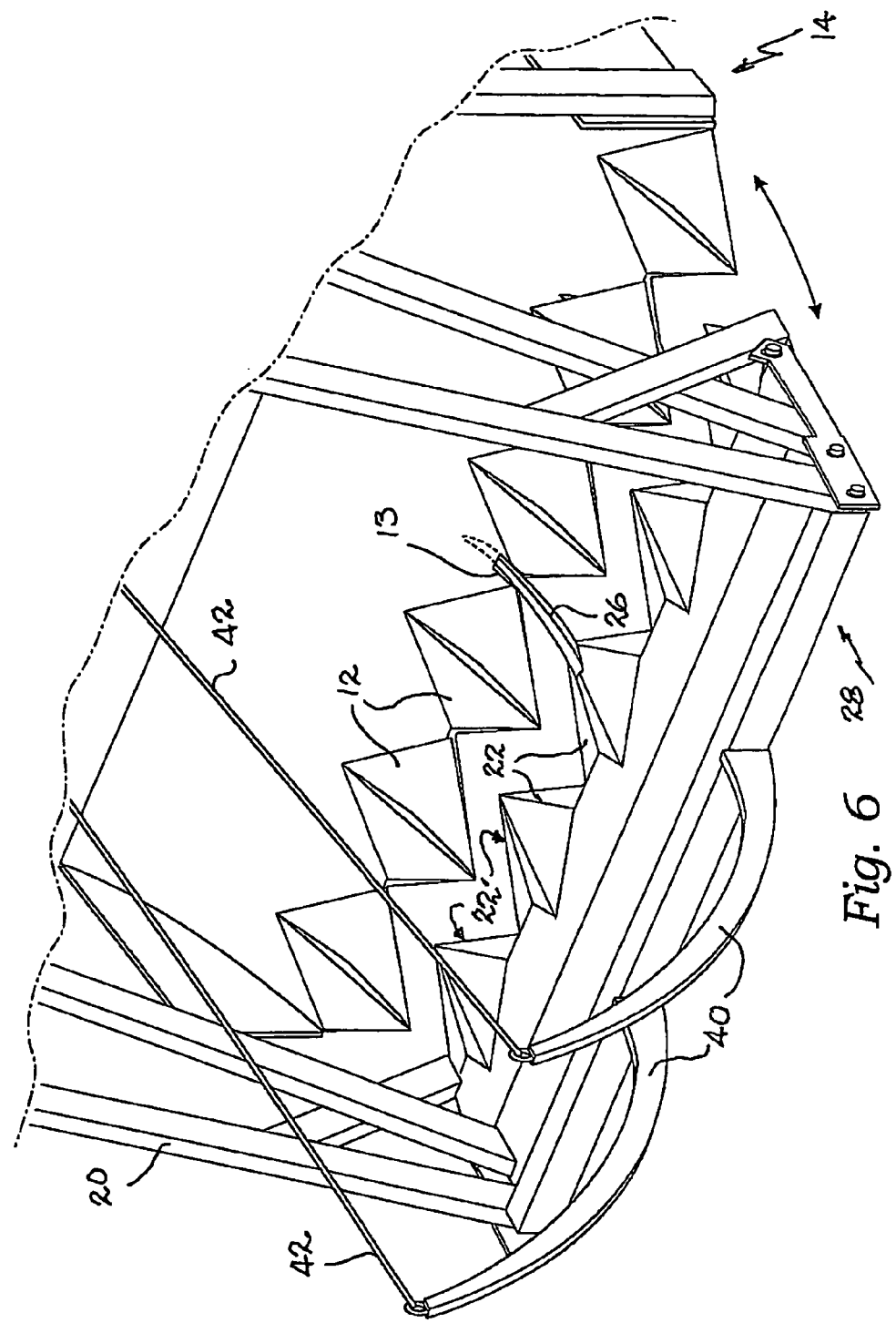
FIG. 6 is an enlarged partial perspective view thereof showing the jaws partially parted and the entry of a spike into an aperture of the lower jaws.

Preferably, an elongate spike 26, as best seen in FIG. 6, is attached to, and extensive from the second set of horizontal teeth 22 toward the first set of horizontal teeth 12, whereby the first set of horizontal teeth 12 provide an access aperture 13 positioned for receiving the elongate spike 26 so that the sets of teeth 12, 22 are able to converge to near contact juxtaposition. As shown in the figures, the spike 26 is long enough to secure the agriculture bale 5 which is immobilized by the teeth 12 of the lower jaw 10.

Preferably, two support arms 40 are engaged with the upper jaw frame 20 proximal the second set of horizontal teeth 22 but are directed away from, i.e., in the opposite direction of the first or second sets of horizontal teeth 12, 22. Preferably, the support arms 40 are constructed large enough to support and carry an upper portion of the severed bale 5 and in order to provide such, are arched slightly upwardly, as best seen in FIG. 6, so that an upper portion of the severed bale 5 is able to be supported and transported confidently, as shown in FIG. 4.

Preferably, a pair of restraining cables 42 is engaged between the upper jaw frame 20 adjacent to the pivot pins 16 and the ends of the support arms 40 as shown in FIG. 6. The cables 42 further preferably include a coil spring 44 enabling an expansive support of the upper portion of the severed bale 5, that is, depending on the size of the bale 5, the cable-spring 42, 44 combination acts to flex and expand to accommodate the upper portion of the severed bale 5 and to provide a method of preventing the wind from blowing away pieces of hay from the upper portion of the severed bale 5 as it sits on the support arms 40. The cables 42 and springs 44 are not needed to keep the upper portion of the severed bale 5 from falling off the support arms 40, but only to protect it from the wind as it is being transported. The reason for this is because after the bale 5 has been cut, the twine that was holding it together has also been severed, and the upper portion of the severed bale 5, while generally holding its shape, is now vulnerable to coming apart, especially in its frontal area 5' (FIG. 4), which is effectively held down by the cables 42.

Figure 1:
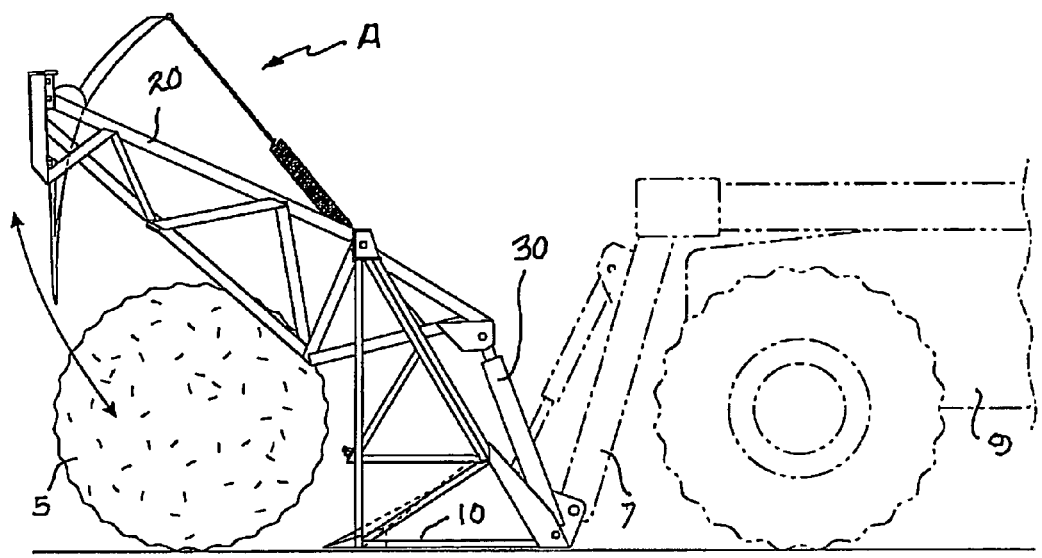
FIG. 1 is a side elevational view of the presently described apparatus showing open jaws surrounding a bale.
Figure 2:
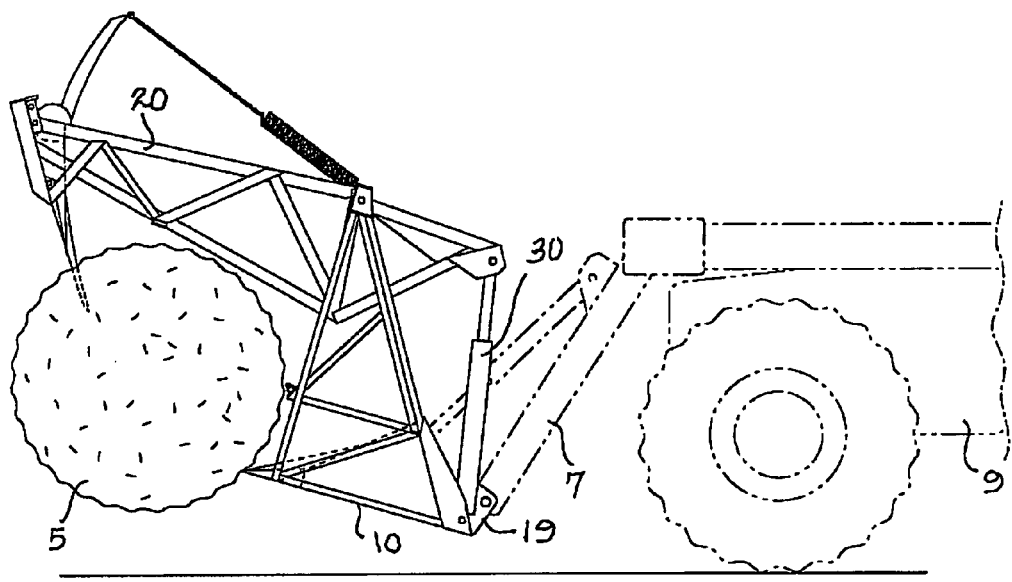
FIG. 2 is a side elevational view thereof showing partially closed jaws lifting the bale.
Figure 4:
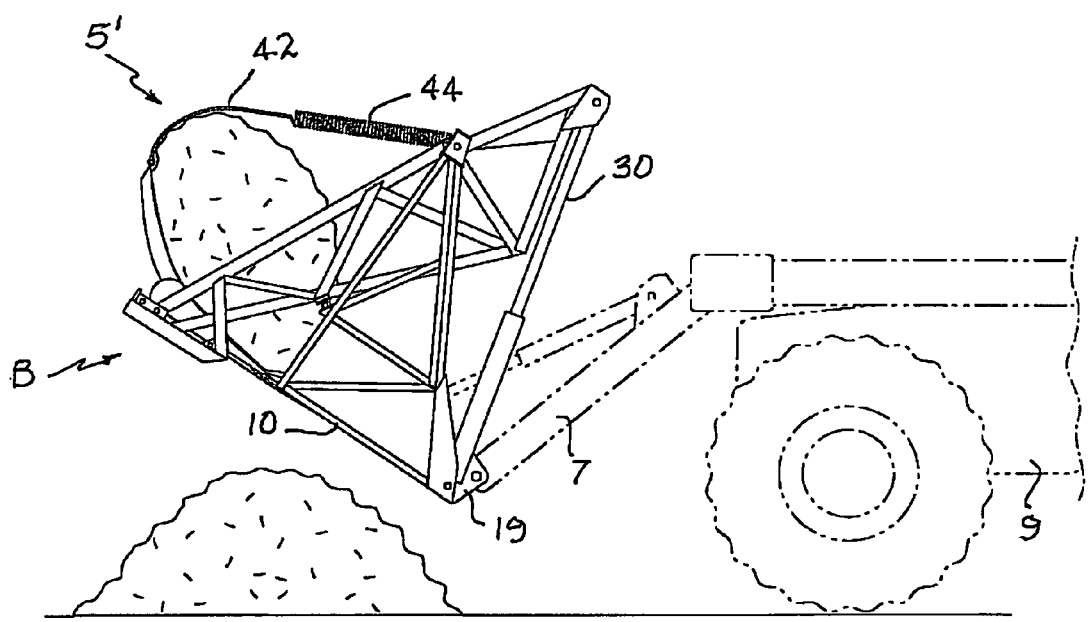
FIG. 4 is a side elevational view thereof showing fully closed jaws securing an upper portion of the severed bale within the jaws.
Figure 5:
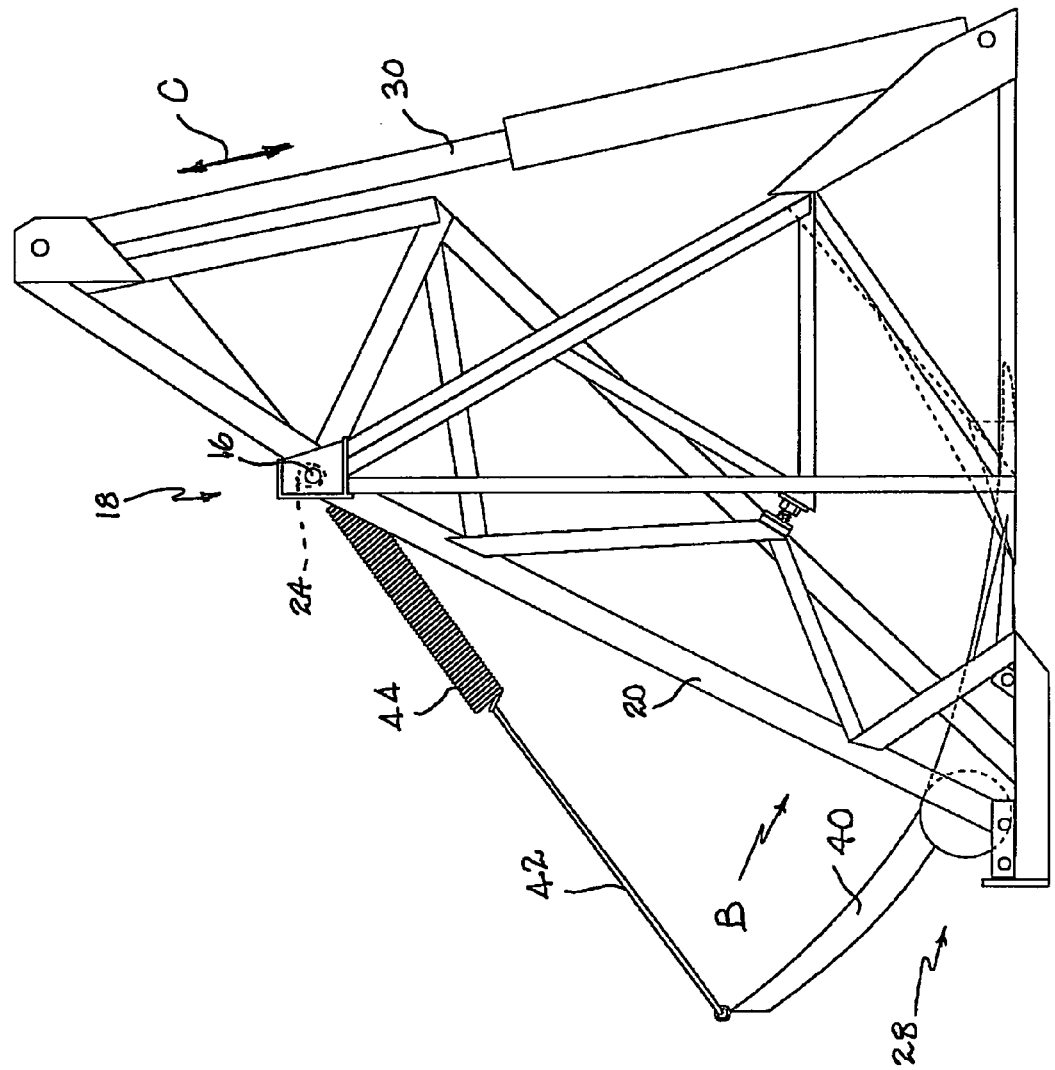
FIG. 5 is an enlarged side elevational view thereof showing the jaws fully closed.

As shown in FIGS. 1-4 the presently described apparatus is preferably mounted on a front end loader 7 on a tractor 9 by struts 19 which are engaged with a rail (not shown) of the lower jaw frame 10. In this manner the apparatus may be lifted as shown in FIGS. 2 and 4.

In use the apparatus is mounted onto a front end loader 7 in place of its bucket. The upper jaw 20 is raised as shown in FIG. 1 and the teeth 12 of the lower jaw 10 are brought into contact with a bale 5 that is to be lifted. Next, using extensor(s) 30, the upper jaw 20 is brought down onto the bale 5 to a position where the spike 26 is driven into the bale 5. This holds the bale 5 in place so that when lower jaw 10 is raised, as shown in FIG. 2, bale 5 moves with the jaws 10, 20. When the bale 5 has been moved to a desired location, the upper jaw 20 is brought down further thereby cutting the bale 5 into two parts as shown in FIG. 3. As shown in FIG. 4, the lower part of the bale 5 is severed and drops to the ground while the upper part of the bale 5 is captured within the jaws 10, 20 and is able to be then transported to a separate location. The upper and lower parts of the severed bale 5, as shown in FIG. 4 are each able to be cut again using the present apparatus.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. An agricultural bale cutter apparatus comprising: a scoop shaped lower jaw frame supporting a first set of horizontal teeth at a lower end thereof; the lower jaw frame engaging an upper jaw frame in pivotal rotation to thereby move a second set of horizontal teeth mounted on the upper jaw frame between distal and proximal positions relative to the first set of horizontal teeth for severing a bale therebetween; at least one linear extensor engaged between the lower and upper jaw frames enabling by extension, said pivotal rotation of the upper jaw frame; and an elongate spike extensive from the second set of horizontal teeth toward the first set of horizontal teeth.

2. The apparatus of claim 1 wherein the first set of horizontal teeth are formed with a non-cutting edge and the second set of horizontal teeth are formed with a cutting edge.

3. The apparatus of claim 1 wherein the first set of horizontal teeth provide an access aperture positioned for receiving the elongate spike as the first and second sets of horizontal teeth mutually converge, thereby enabling the two sets of teeth to assume near contact.

4. The apparatus of claim 1 further comprising at least one support arm engaged with the upper jaw frame proximal the second set of horizontal teeth and directed away from the first set of horizontal teeth, the at least one support arm having a size and shape enabling the support and carrying of an upper portion of the bale when the bale is severed.

5. The apparatus of claim 4 further comprising at least one restraining cable extending between the upper jaw frame and the at least one of the support arms.

6. The apparatus of claim 4 further comprising at least one restraining cable with a coil spring, the cable and spring extending between the upper jaw frame and the at least one of the support arms.

7. An agricultural bale cutter apparatus comprising:
a lower jaw frame supporting a first set of teeth;
an upper jaw frame in pivotal rotation about the lower jaw frame thereby moving a second set of teeth mounted on the upper jaw frame between distal and proximal positions relative to the first set of teeth for cutting a bale therebetween; a linear extensor engaged between the lower and upper jaw frames enabling, by extension and retraction thereof, said pivotal rotation of the upper jaw frame toward and away from the lower jaw frame; and
an elongate spike extensive from the second set of teeth toward the first set of teeth.

8. The apparatus of claim 7 wherein at least one of the first set and the second set of teeth are formed with a cutting edge.

9. The apparatus of claim 7 wherein the first set of teeth provide an access aperture positioned for receiving the elongate spike as the sets of teeth mutually converge.

10. The apparatus of claim 7 further comprising at least one support arm engaged with the upper jaw frame proximal the second set of teeth and directed away from the first set of teeth, the at least one support arm having a size and shape enabling the support and carrying of the upper portion of the bale when the bale is severed into an upper and a lower portions.

11. The apparatus of claim 10 further comprising at least one restraining cable engaged between the upper jaw frame and the at least one support arm.

12. The apparatus of claim 11 wherein the at least one restraining cable joins at least one coil spring.

13. A method of severing a bale initially supported by a ground surface, the method comprising the steps of: moving a set of teeth of a lower jaw of an apparatus into contact with the bale; bringing an upper jaw down toward the bale thereby piercing the bale with an elongate spike extending outwardly from the upper jaw and thereby clamping the bale between upper and lower jaws; lifting the lower jaw to raise the bale to a position above the ground surface; lowering the upper jaw thereby driving teeth of the upper jaw through the bale so as to sever the bale between the lower and upper teeth while engaging the spike within an aperture in the lower jaw.

14. The method of claim 13 further comprising the step of dropping a lower portion of the severed bale to the ground surface.

15. The method of claim 14 further comprising the step of shaking the machine to loosen the lower portion of the severed bale from the upper portion of the severed bale.

16. The method of claim 15 further comprising the step of opening the jaws to drop an upper portion of the severed bale to the ground surface.

* * * * *